(12) United States Patent
Lu

(10) Patent No.: US 10,782,987 B2
(45) Date of Patent: Sep. 22, 2020

(54) DISTRIBUTED DATABASE DRIVER MIDDLEWARE

(71) Applicant: Quest Software Inc., Aliso Viejo, CA (US)

(72) Inventor: Yang Lu, ZhongShan (CN)

(73) Assignee: Quest Software Inc., Aliso Viejo, CA (US)

( * ) Notice: Subject to any disclaimer, the term of this patent is extended or adjusted under 35 U.S.C. 154(b) by 700 days.

(21) Appl. No.: 14/960,043

(22) Filed: Dec. 4, 2015

(65) Prior Publication Data

US 2017/0161327 A1 Jun. 8, 2017

(51) Int. Cl.
*G06F 9/455* (2018.01)
*G06F 16/2458* (2019.01)
*G06F 16/25* (2019.01)
*G06F 9/4401* (2018.01)

(52) U.S. Cl.
CPC ...... *G06F 9/45504* (2013.01); *G06F 16/2471* (2019.01); *G06F 16/256* (2019.01); *G06F 9/4411* (2013.01)

(58) Field of Classification Search
CPC ......... G06F 17/30471; G06F 17/30554; G06F 17/30418; G06F 17/30
USPC .......................................................... 707/716
See application file for complete search history.

(56) References Cited

U.S. PATENT DOCUMENTS

| | | | | |
|---|---|---|---|---|
| 7,702,610 B2* | 4/2010 | Zane | ................... | G06F 16/2448 |
| | | | | 707/999.001 |
| 2008/0065593 A1* | 3/2008 | Minder | ............... | G06F 16/2423 |

* cited by examiner

*Primary Examiner* — Hosain T Alam
*Assistant Examiner* — Tracy M McGhee
(74) *Attorney, Agent, or Firm* — Kirton McConkie; Brian Tucker

(57) ABSTRACT

JDBC-X, which is distributed database driver middleware, can extend the JDBC API to facilitate integrating an application with a distributed database. JDBC-X functions as an intermediary between the JDBC API and the JDBC drivers and provides a number of components that adapt JDBC SQL queries and corresponding result sets in a manner that is substantially transparent to the application. In this way, an application that was originally designed to access a relational database can be seamlessly converted to accessing a distributed database. Similarly, JDBC-X allows an application to employ a distributed database that is dynamically provisioned without needing to be aware of the current structure of the database.

16 Claims, 8 Drawing Sheets

DISTRIBUTED DATABASE DRIVER MIDDLEWARE

CROSS-REFERENCE TO RELATED APPLICATIONS

N/A

BACKGROUND

The present invention is generally directed to distributed database driver middleware. In particular, the present invention is directed to an extension of the Java Database Connectivity (JDBC) API which allows application code written in the Java programming language to be easily adapted to access a distributed database.

The JDBC API is the industry standard for database-independent connectivity between the Java programming language and a wide range of databases. The JDBC API provides a call-level API for SQL-based database access. JDBC technology allows the Java programming language to be used to exploit "Write Once, Run Anywhere" capabilities for applications that require access to enterprise data. The JDBC API contains two major sets of interfaces: the first is the JDBC API for application writers, and the second is the lower-level JDBC driver API for driver writers.

Organizations are storing increasingly larger amounts of data in databases. As the size of databases grows, so does the complexity of processing queries to such databases. As a result, the performance of applications that rely on the databases can suffer.

One technique that has been used to address the increasing size/complexity of databases is the use of distributed databases. Generally speaking, a distributed database (also commonly known as a key/value database) is one in which a table of the database is stored across multiple machines. For example, a table may be divided horizontally or vertically into a number of "shards" where each shard is stored on a different database server. With horizontal sharding, the rows of the table are divided among the different database servers, whereas, with vertical sharding, the columns of the table are divided among the different database servers.

If an application has been written to access one type of database using the JDBC API, whether the database is a traditional relational database or another type of distributed database, it is difficult to modify the application to employ a distributed database. For example, the source code of some applications may not be fully portable to other databases. Also, some applications only support one database type. Migrating such applications to support another database may require a substantial amount of source code changes. These changes take time and effort and may result in a number of bugs being introduced into the code.

BRIEF SUMMARY

The present invention extends to methods, systems, and computer program products for implementing distributed database driver middleware (hereinafter "JDBC-X") that extends the JDBC API to facilitate integrating an application with a distributed database. JDBC-X functions as an intermediary between the JDBC API and the JDBC drivers and provides a number of components that adapt JDBC SQL statements and corresponding result sets in a manner that is substantially transparent to the application. In this way, an application that was originally designed to access a relational database can be seamlessly converted to accessing a distributed database.

JDBC-X includes the JDBC-X API, the JDBC-X load balancer, and the JDBC-X connection pool. These components are configured to interface with the standard JDBC API and JDBC drivers to perform the appropriate processing on JDBC queries and corresponding results. For example, these components can interoperate to allow a JDBC SQL statement received via the JDBC API to be parsed, optionally optimized, and routed via a connection pool to the appropriate JDBC driver for submission to the appropriate database. These intermediate functions can be performed in a manner that is substantially transparent to the application. In other words, the application can submit SQL statements to and receive result sets from the JDBC API in a standard manner (e.g., as if the underlying database were a relational database) even though the underlying database is a distributed database.

In one embodiment, the present invention is implemented by distributed database driver middleware as a method for processing a JDBC SQL statement. Information is received that defines a structure of a table that is stored in a distributed database such that the table is sharded across a plurality of database nodes of the distributed database. A JDBC SQL statement is received via the JDBC API and from an application. The JDBC SQL statement identifies the table and an operation to be performed on the table. The information that defines the structure of the table is accessed to identify which database nodes of the distributed database store a shard of the table. One or more SQL statements are then generated that each include routing information for routing the SQL statement to a particular database node on which a particular shard of the table is stored.

In another embodiment, the present invention is implemented as computer storage media that stores computer executable instructions defining distributed database driver middleware. The distributed database driver middleware includes: (1) a database metadata store configured to store information defining a structure of a table that is stored in a distributed database including defining which database nodes of the distributed database store a shard of the table; and (2) a SQL provider configured to: receive, from an application via the JDBC API, a JDBC SQL statement that identifies the table and an operation to be performed on the table; access the database metadata store to identify which database nodes store a shard of the table; and generate one or more SQL statements that each include routing information for routing the SQL statement to a particular database node on which a particular shard of the table is stored.

In another embodiment, the present invention is implemented as a method, performed by distributed database driver middleware, for processing a JDBC SQL statement. Information is received that defines a structure of a table that is stored in a distributed database such that the table is sharded across a plurality of database nodes of the distributed database. A JDBC SELECT statement to be performed on the table is received from an application via the JDBC API. The information that defines the structure of the table is accessed to identify which database nodes of the distributed database store a shard of the table. A SELECT statement is generated for each of the database nodes that stores a shard of the table. Each SELECT statement includes routing information for routing the SELECT statement to the corresponding database node. A result set is received from each of the database nodes that stores a shard of the table.

The result sets are merged to produce a single result set. The single result set is then returned to the application via the JDBC API.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification, the JDBC-X architecture will be described as including a number of different components that perform different functions. However, the attribution of particular functions to particular components is primarily for simplicity in explaining the invention. In many cases, one component could be configured to perform the functionality attributed to another component of the JDBC-X architecture. Accordingly, the present invention should not be limited to any particular arrangement of components and the functionality that they are described as providing but should encompass the functionality described herein regardless of which components actually perform the functionality.

Figure 1:
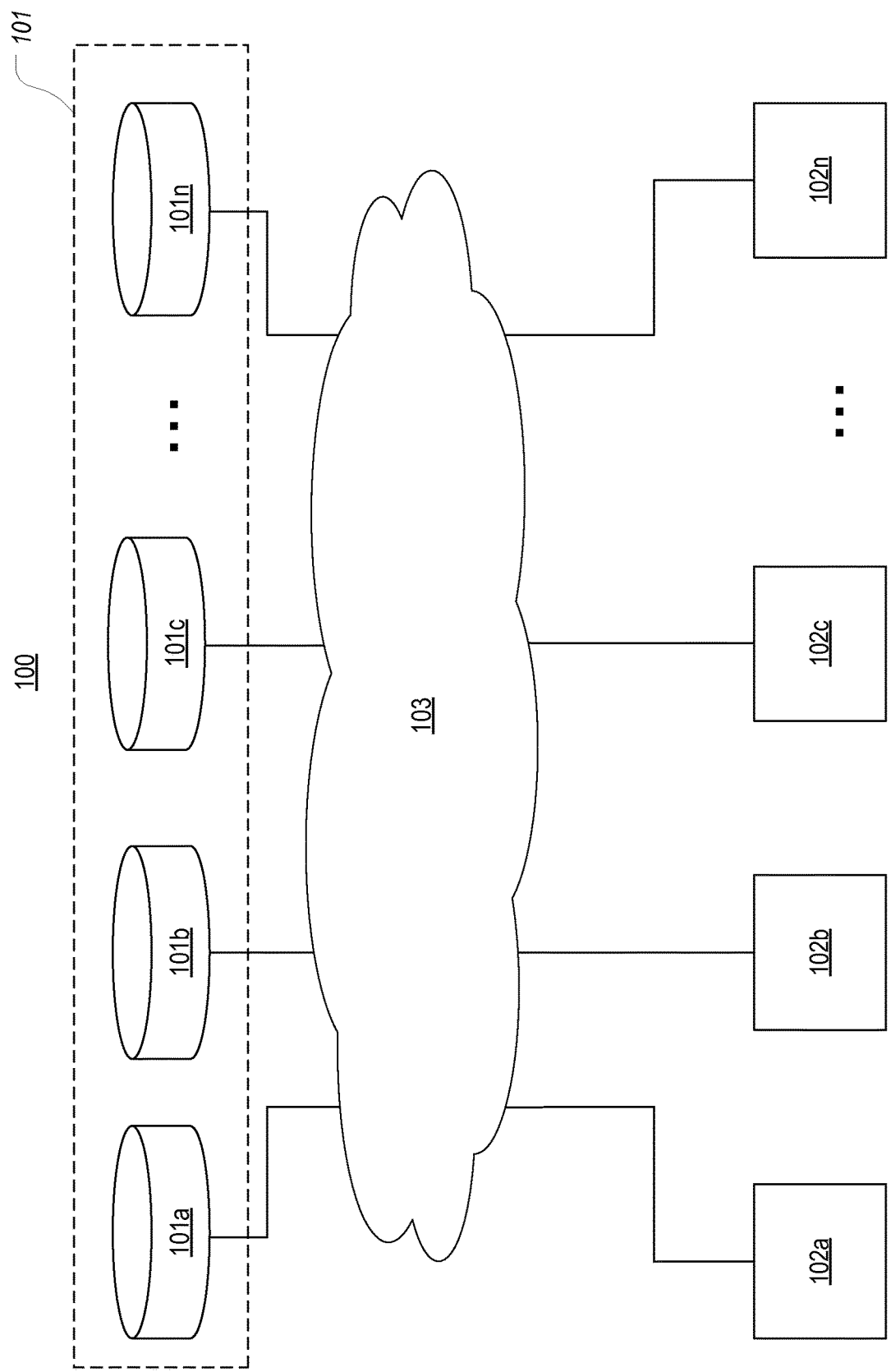
FIG. 1 illustrates an example computing environment in which the present invention can be implemented.

FIG. 1 illustrates an example computing environment 100 in which the present invention can be implemented. Computing environment 100 includes a number of client computing devices 102a-102n and a distributed database 101 comprising database nodes 101a-101n which are each connected to client computing devices 102a-102n via a network 103. Client computing devices 102a-102n can represent any computing device that is configured to access distributed database 101. Network 103 can represent any number and/or type of network and/or connection including the internet, a local network, or even a localhost connection.

Distributed database 101 is a dynamically allocated database. In other words, database nodes 101a-101n are dynamically allocated. For example, any of database nodes 101a-101n could be dynamically added to distributed database 101 based on processing or storage needs of an application that employs distributed database 101. Accordingly, in some embodiments, distributed database 101 can represent a "cloud database."

Figure 2:
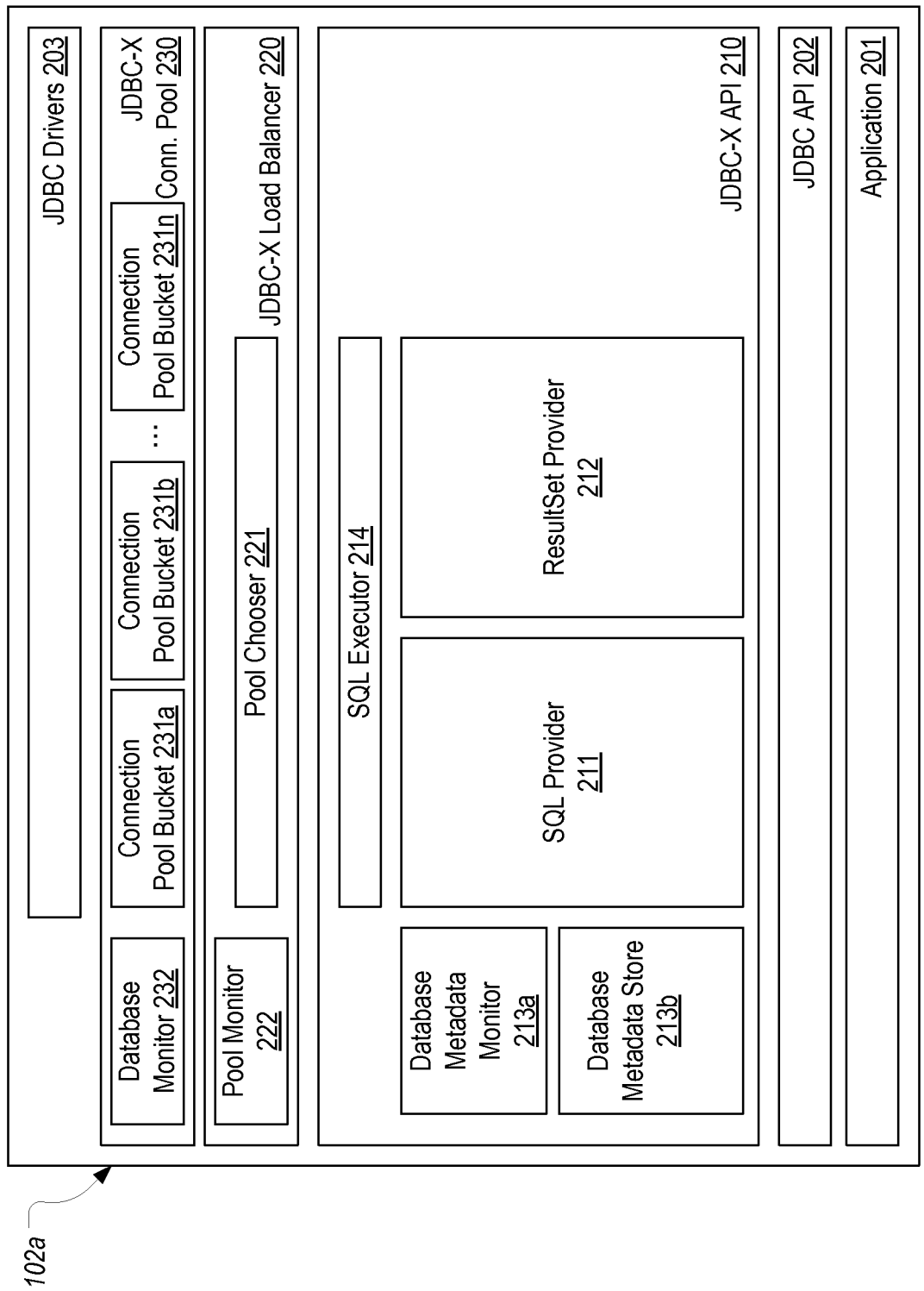
FIG. 2 represents the JDBC architecture in accordance with one or more embodiments of the present invention.

Each of client computing devices 102a-102n can include the JDBC-X architecture in accordance with one or more embodiments of the present invention. The JDBC-X architecture encompasses both the standard JDBC APIs as well as the components of the JDBC-X middleware. FIG. 2 provides an example of this JDBC-X architecture on client computing device 102a. Each of the other client computing devices 102b-102n could be similarly configured.

As shown in FIG. 2, client computing device 102a includes an application 201 that is written in the Java programming language and employs the JDBC API 202 to allow the application to submit SQL statements and receive corresponding result sets. As indicated above, the JDBC API 202 is a standard that provides programmatic access to relational data from the Java programming language.

The JDBC-X architecture also includes JDBC drivers 203. JDBC drivers 203 are configured to convert JDBC SQL statements into the appropriate database-specific protocol. There are a number of different types of JDBC drivers. The function and role of these JDBC drivers are known by those skilled in the art and are not essential for an understanding of the present invention. Suffice it to say that JDBC drivers 203 function as an interface between the JDBC-X middleware and the various different types of database nodes 101a-101n.

In accordance with embodiments of the present invention, the JDBC-X architecture also includes JDBC-X API 210, JDBC-X load balancer 220, and JDBC-X connection pool 230. As shown, these three components are positioned "between" JDBC API 202 and JDBC drivers 203 to allow the components to process a "standard" JDBC SQL statement received from application 201 via JDBC API 202 into appropriate SQL statements that can be submitted to distributed database 101 (i.e., to the multiple database nodes 101a-101n that make up distributed database 101). Similarly, these three components can allow any results of these SQL statements to be processed to yield an appropriately configured JDBC result set. Importantly, the functions of these components can be performed in a manner that is substantially transparent to application 201.

JDBC-X API 210 includes SQL provider 211, ResultSet provider 212, database metadata monitor 213a, database metadata store 213b, and SQL executor 214. By way of an overview, SQL provider 211 is tasked with receiving a JDBC SQL statement from JDBC API 202 and converting the statement into a number of statements based on the structure of distributed database 101. These statements can then be provided to SQL executor 214 for execution via the appropriate connection pool as will be further described below. Database metadata monitor 213a monitors the structure of distributed database 101 (e.g., how a table is sharded) and stores metadata defining this structure in database metadata store 213b. Accordingly, SQL provider 211 employs the metadata stored in database metadata store 213b to generate the appropriate SQL statements.

ResultSet provider 212 performs a similar, albeit inverse, function on the results of the SQL statements generated by SQL provider 211. In particular, the execution of the SQL statements will generate a number of results (i.e., results obtained from each database node that includes an applicable shard). ResultSet provider 212 processes these results to generate a result set that can be provided back to application 201 via JDBC API 202.

JDBC-X load balancer 220 includes pool chooser 221 and pool monitor 222. Pool monitor 222 is responsible for monitoring the current status of each connection pool bucket. Pool chooser 221 decides which connection pool to choose (e.g., to process an INSERT statement) based on the current status of the connection pool buckets (i.e., based on the information provided by pool monitor 222). This decision can be based on random selection, database load, or incoming query logic and in accordance with the current status of each connection pool bucket.

JDBC-X connection pool 230 includes database monitor 232 which listens for changes in distributed database 101, such as, for example, the addition of a new database node. Generally speaking, database monitor 232 is a component that is configured to listen for communications from a remote configuration server that identify the current configuration or structure of a distributed database. Based on information provided by database monitor 232, JDBC-X connection pool 230 maintains a connection pool bucket for each database node in distributed database 101. For example, FIG. 2 shows that JDBC-X connection pool 230 has created connection pool buckets 231a-231n for database nodes 101a-101n respectively. If a new database node were provisioned for distributed database 101, database monitor 232 would identify the newly provisioned database node and create a new connection pool bucket for connections to the new database node. Similarly, if one of database nodes 101a-101n were deprovisioned, database monitor 232 would remove its corresponding connection pool bucket.

Figure 3A:
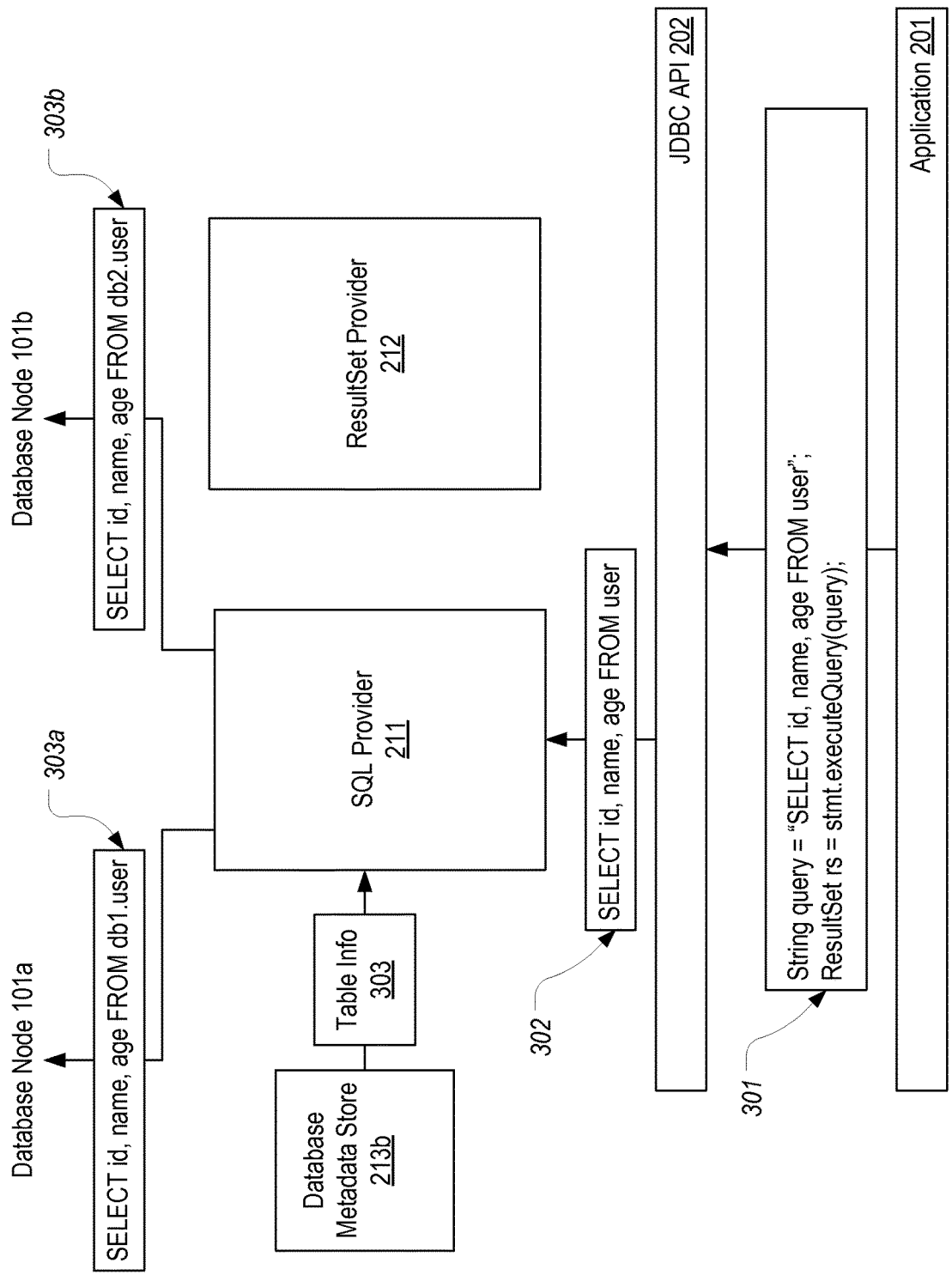
FIGS. 3A and 3B provide an example of how a JDBC SELECT statement can be processed by the JDBC-X architecture.
Figure 3B:
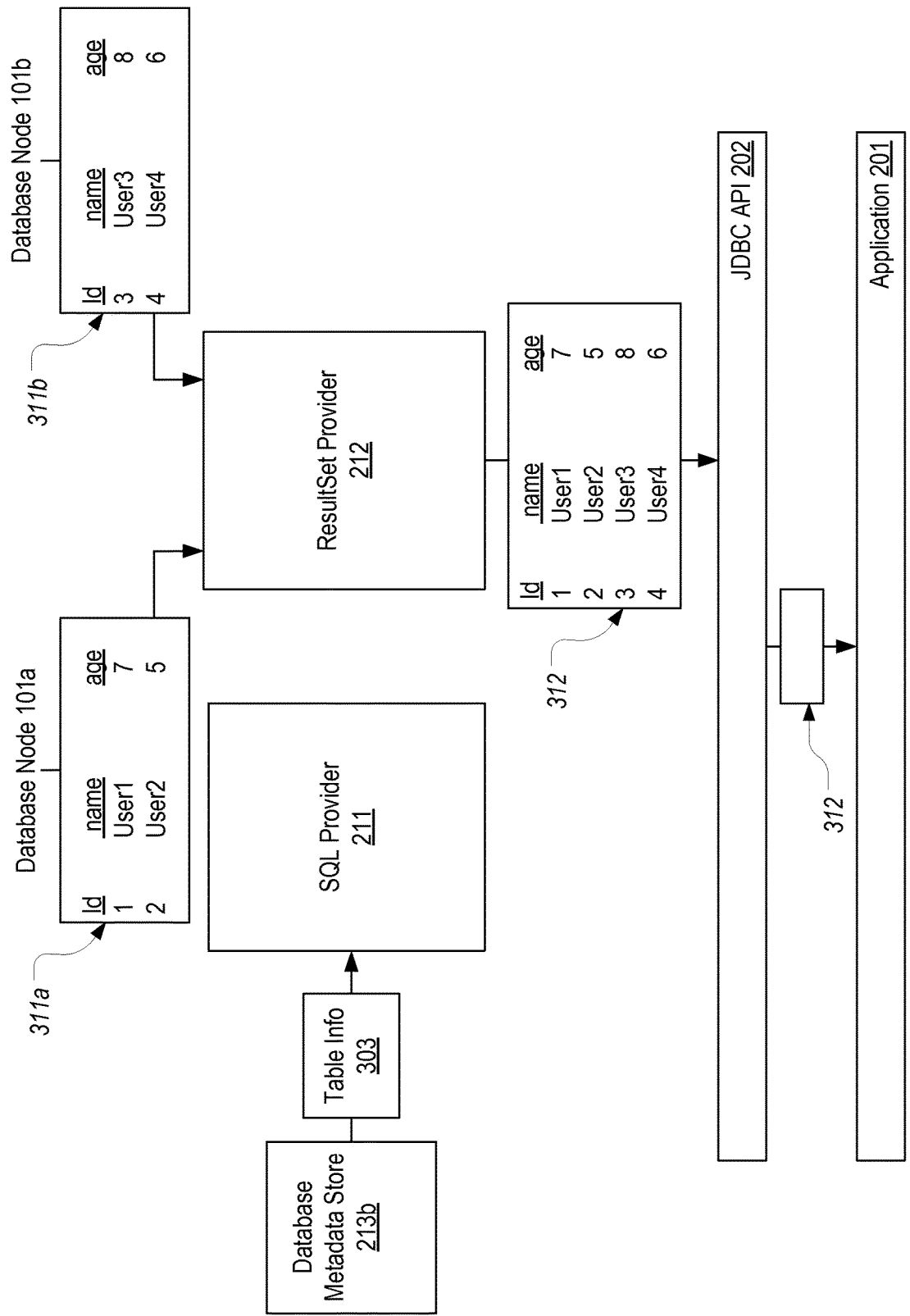

FIGS. 3A and 3B provide an example of how the JDBC-X architecture functions. For simplicity, in this example it will be assumed that distributed database 101 includes two database nodes 101a and 101b on which a table, user, has been horizontally sharded. In other words, both database nodes 101a and 101b store complete entries to the user table.

As shown, application 201 uses JDBC API 202 to submit a SQL statement in a typical manner. A code snippet 301 is provided to represent how application 201 would do so. Snippet 301 shows that the string "query" is assigned a value of "SELECT id, name, age FROM user." This query represents a select statement in SQL which will return the id, name, and age columns from the "user" table. This string is then passed as the argument of the executeQuery method of the Statement object, stmt. The result of the executeQuery method is assigned to the ResultSet object, rs. It is noted that snippet 301 represents standard functionality provided by JDBC API 202. Of importance to the invention is the fact that application 201 is able to submit the query string via the executeQuery method in a standard manner even though the user table is horizontally sharded. In other words, the exact structure of the user table is abstracted from application 201 because of the functionality provided by JDBC-X API 210.

In particular, SQL provider 211 is configured to receive the JDBC SQL statement 302 from JDBC API 202. In this context, "JDBC SQL statement" will refer to a SQL statement received from JDBC API 202. Upon receiving JDBC SQL statement 302, SQL provider 211 can access database metadata store 213b to obtain table information 303. In this example, table information 303 can define how the user table is sharded (or partitioned) within distributed database 101. As indicated above, it is assumed that distributed database 101 includes only database nodes 101a and 101b and that the user table is horizontally sharded across these nodes.

Based on table information 303, SQL provider 211 can modify statement 302 to generate multiple statements 303a and 303b that are directed to database nodes 101a and 101b respectively. For example, statement 303a has been generated as "SELECT id, name, age FROM db1.user" where db1 represents routing information to database node 101a. Similarly, statement 303b has been generated as "SELECT id, name, age FROM db2.user" where db2 represents routing information to database node 101b. Accordingly, SQL provider 211 converts statement 302 into multiple statements that each includes proper routing information so that the SELECT query is performed on each database node that includes a shard of the user table. Importantly, this process is performed transparently from application 201's perspective.

Each of statements 303a and 303b can be executed using a connection selected from the appropriate pool bucket and via the appropriate JDBC driver. In particular, based on the routing information in each of statements 303a (db1.user) and 303b (db2.user), pool chooser 221 can select a connection from the appropriate connection pool bucket (e.g., connection pool buckets 231a and 231b respectively) so that each statement is directed to the appropriate shard of the user table. In response to the execution of statements 303a and 303b, two result sets will be generated: result set 311a which contains the id, name, and age of entries in the shard of the user table stored on database node 101a; and result set 311b which contains the id, name, and age of entries in the shard of the user table stored on database node 101b. Result sets 311a and 311b are provided to ResultSet provider 212 which merges them into a single result set 312. ResultSet provider 212 can then provide result set 312 to JDBC API 202 which will return result set 312 to application 201 (e.g., by populating the ResultSet object, rs, with the contents of result set 312).

Figure 4:
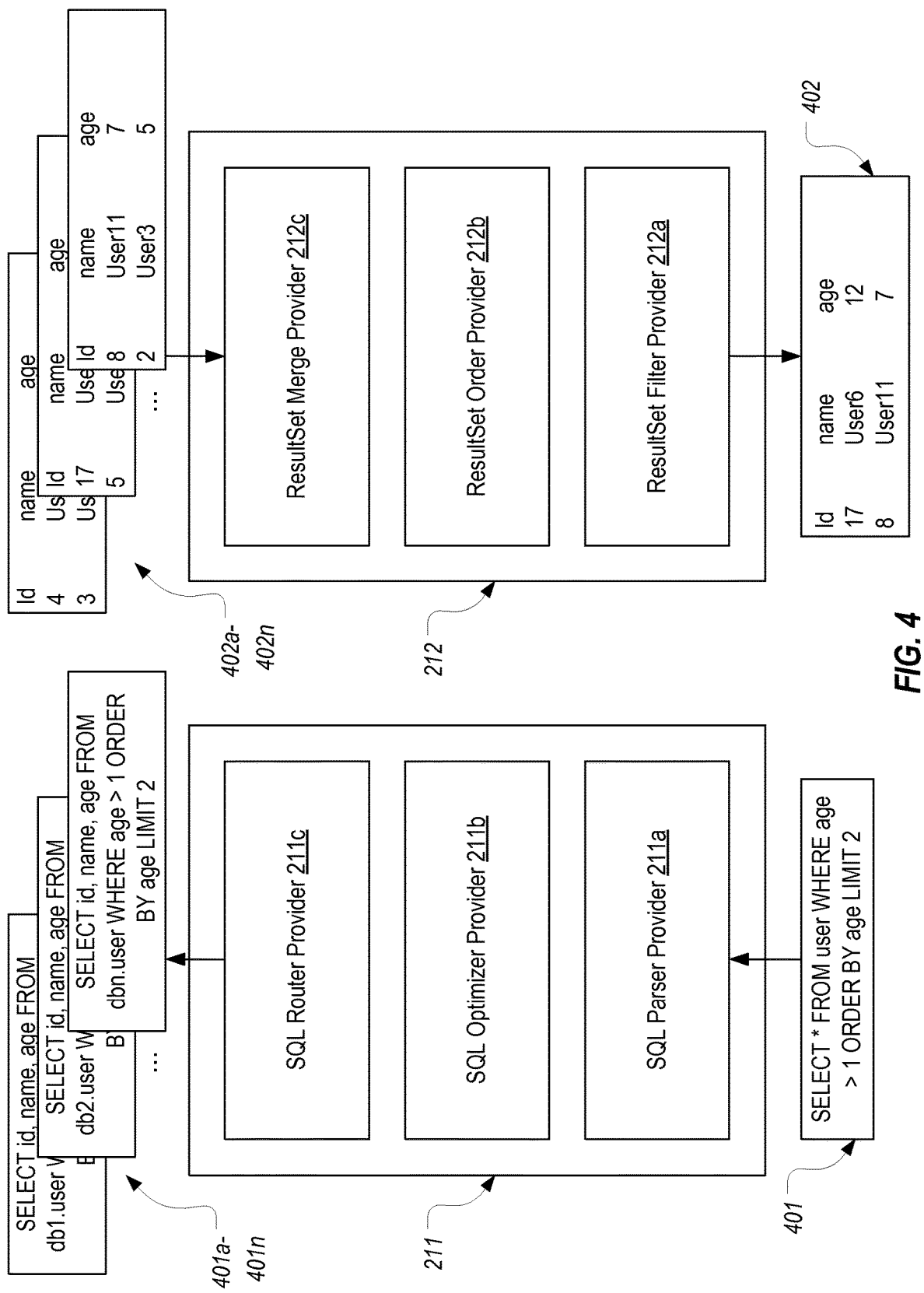
FIG. 4 provides another example of how a JDBC SELECT statement can be processed by the JDBC-X architecture.

The example provided in FIGS. 3A and 3B is a simplified example intended to show how JDBC-X API 210 abstracts the sharded architecture of the user table. However, SQL provider 211 and ResultSet provider 212 can provide additional functionality as shown in FIG. 4. SQL provider 211 can include a SQL parser provider 211a, a SQL optimizer provider 211b, and a SQL router provider 211C. SQL parser provider 211a can be configured to parse a JDBC SQL statement 401 which in this example is "SELECT * FROM user WHERE age >1 ORDER BY age LIMIT 2." The parsed JDBC SQL statement 401 may optionally be optimized (e.g., by replacing the * wildcard with the specific columns in the user table). This parsing and optimizing process can be performed using techniques known in the art. After parsing and any optimizing, SQL router provider 211c can generate individual statements for each database node as described above (e.g., by replacing "user" with the pathway to the corresponding shard of the user table). For example, FIG. 4 illustrates that statements 401a-401n have been generated corresponding to shards stored on database nodes 101a-101n respectively.

Statements 401a-401n can then be executed (e.g., via SQL executor 214) to obtain corresponding result sets 402a-402n. Each result set includes two results (in accordance with the LIMIT 2 option) which are ordered by age (in accordance with the ORDER BY age option) and which have an age greater than 1 (in accordance with the WHERE age >1 option). To generate an appropriate result set that can be returned to application 201, ResultSet provider 212 includes ResultSet merge provider 212c, ResultSet order provider 212b, and ResultSet filter provider 212a.

Result sets 402a-402n are first provided to ResultSet merge provider 212c which merges the result sets into a single result set. Then, ResultSet order provider 212b can perform any ordering on the merged result set. In this example, JDBC SQL statement 401 included an ORDER by age option, and therefore, ResultSet order provider 212*b* can order the result set by age. Finally, the merged and ordered result set is provided to ResultSet filter provider 212*a* which can apply any filters to the merged and ordered result set. In this example, JDBC SQL statement 401 indicated that the result set should be limited to two results. Accordingly, ResultSet filter provider 212*a* generates a result set 402 that includes only two users that are the oldest.

It is noted that the providers depicted in FIG. 4 are only some of the possible providers that may be included in ResultSet Provider 212. In some embodiments, ResultSet Provider 212 may also include providers for providing a count, min, max, or grouping of the results.

The example in FIG. 4 is specific to a SELECT statement. However, SQL provider 211 would perform similar processing on a UPDATE statement, a DELETE statement, or other similar statement that operates on data already present in the user table. For example, given a JDBC SQL statement of "UPDATE user SET age=15 WHERE age>=5," and assuming the user table is horizontally sharded across database nodes 101*a*-101*n*, SQL provider 211 could generate the following statements that include appropriate routing information for routing the UPDATE statement to each of database nodes 101*a*-101*n*:

UPDATE *db*1.user SET age = 15 WHERE age >= 5;
UPDATE *db*2.user SET age = 15 WHERE age >= 5;
...
UPDATE *dbn*.user SET age = 15 WHERE age >= 5;

Similarly, given a JDBC SQL statement of "DELETE FROM user WHERE age >=5," and again assuming the user table is horizontally sharded across database nodes 101*a*-101*n*, SQL provider 211 could generate the following statements with the appropriate routing information:

DELETE FROM *db*1.user WHERE age >= 5;
DELETE FROM *db*2.user WHERE age >= 5;
...
DELETE FROM *dbn*.user WHERE age >= 5.

Although UPDATE and DELETE statements do not yield the same type of result set as a SELECT statement, ResultSet provider 212 can still process the results of such statements. For example, these statements may return a number of rows that were affected by the operation (i.e., the count). In such cases, ResultSet provider 212 could be configured to calculate the total number of rows affected and return this value to JDBC API 202.

In summary, SQL provider 211 functions to convert a JDBC SQL statement into a number of different SQL statements corresponding to each database node on which a shard of the table is stored, while ResultSet provider 212 functions to convert the corresponding multiple result sets into a single result set consistent with the JDBC SQL statement. This functionality can be provided in a manner that is transparent to the application such that the application need not be aware of how a table may be sharded. For example, with respect to the example of FIGS. 3A, 3B, and 4, the user table may be dynamically sharded (whether horizontally or vertically) among the nodes of distributed database 101 without application 201 needing to be aware of this sharding.

In the previous examples, JDBC-X load balancer 220 has played a minimal routing role in the processing of a JDBC SQL statement. This is because the example SELECT, UPDATE, and DELETE statements will always require a connection to each database node on which a shard of the specified table is stored. However, in the case of an INSERT (or other similar SQL statement that causes an entry to be newly added to distributed database 101), JDBC-X load balancer 220 can be tasked with selecting a connection pool for handling the INSERT statement because the data will be inserted into a single shard.

More particularly, when the JDBC SQL statement is directed to existing entries in a table stored in distributed database 101, SQL provider 211 uses database metadata store 213*b* to determine which database nodes store a shard of the table and creates statements with routing information to direct the statements to each of these shards. In such cases, JDBC-X load balancer 220 only routes these statements appropriately based on the routing information. In contrast, when the JDBC SQL statement adds a new entry to the table, SQL provider 211 can allow JDBC-X load balancer 220 to select which shard the entry will be added to. This selection can be performed by pool chooser 221 based on information provided by pool monitor 222.

As indicated above, pool monitor 222 monitors the status of each connection pool bucket 231*a*-231*n*. This status can be provided to pool chooser 221 to allow pool chooser 221 to select an appropriate connection pool bucket. For example, pool chooser 221 could select connection pool bucket 231*a* based on a determination that database node 101*a* has the smallest load. Alternatively, pool chooser 221 could select a particular connection pool bucket based on an analysis of the SQL statement. For example, one database node may be better suited to handle a particular SQL statement. In such cases, pool chooser 221 could select the connection pool bucket for that database node. Also, in some cases, such as when load is equally distributed among the database nodes, pool chooser 221 may randomly select a connection pool bucket. Various techniques for selecting an appropriate connection pool and therefore an appropriate shard on which to insert an entry will be further described below.

Figure 5:
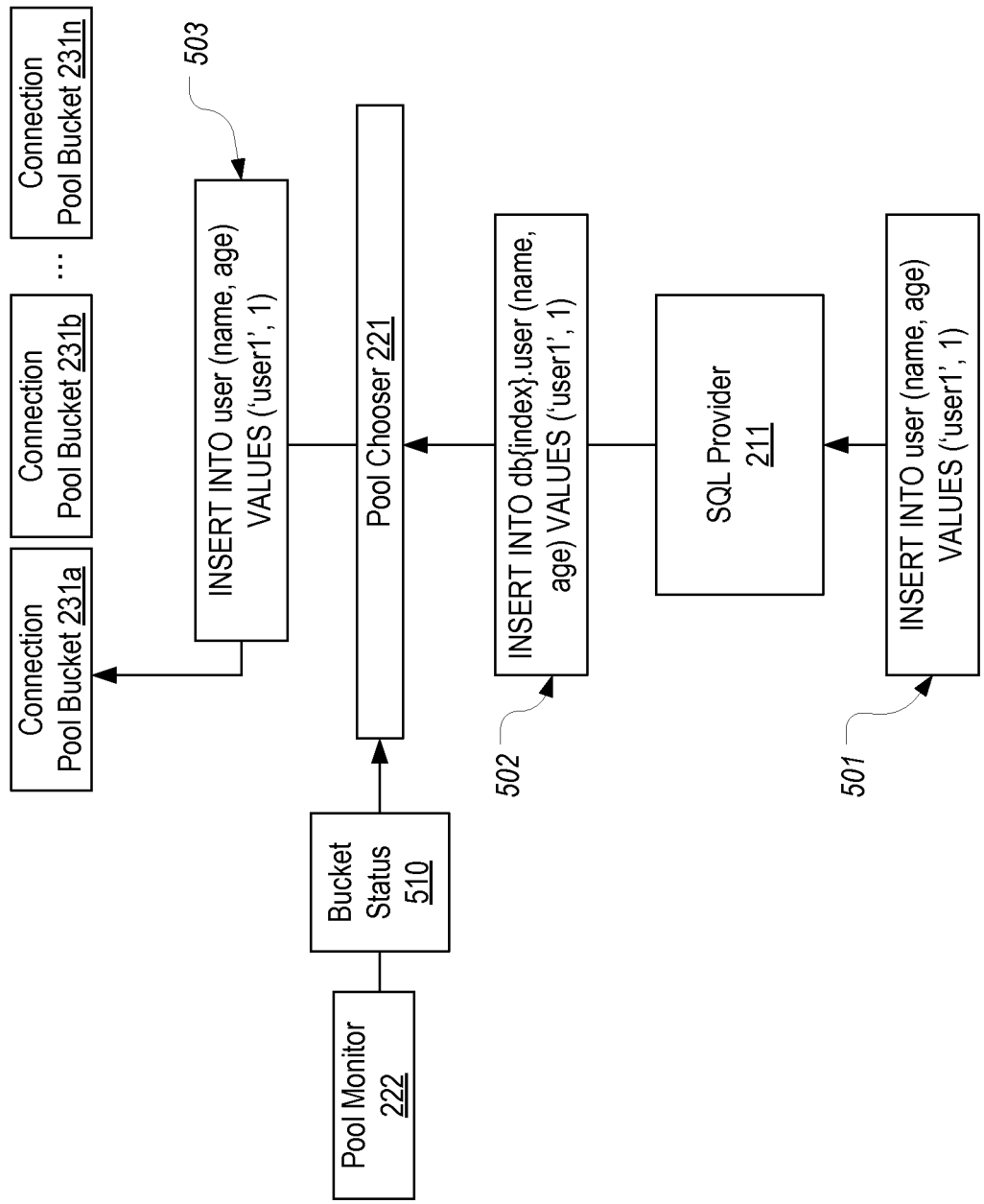
FIG. 5 provides an example of how a JDBC INSERT statement can be processed by the JDBC-X architecture.

FIG. 5 provides an example of how SQL provider 211 can structure a SQL statement to inform pool chooser 221 of the need to select an appropriate connection pool bucket. In FIG. 5, SQL provider 211 receives a JDBC SQL statement 501 from JDBC API 202. JDBC SQL statement 501 is an INSERT statement for adding an entry to the user table. Accordingly, it is necessary to select one of the shards of the user table into which the entry should be inserted. SQL provider 211 can perform similar processing as described above with respect to a SELECT statement. However, since SQL provider 211 does not yet know how the INSERT statement should be routed, SQL provider 211 generates SQL statement 502 which includes an indication ("db{index}") to signify to pool chooser 221 that a particular connection pool should be chosen to handle this statement. It is noted that this syntax is arbitrary and any means for informing pool chooser 221 to select an appropriate connection pool could be used. For example, pool chooser 221 could be configured to select an appropriate connection pool any time the statement is an INSERT or other similar statement.

In any case, in response to receiving SQL statement 502, pool chooser 221 can select a connection from an appropriate connection pool bucket in any manner described above. For example, pool chooser 221 may determine, based on bucket status 510 received from pool monitor 222, that connection pool bucket 231a corresponding to database node 101a has the smallest load. Therefore, pool chooser 221 may employ a connection from connection pool bucket 231a to handle SQL statement 503. It is noted that SQL statement 503 is shown as having the indication "db{index}.user" replaced with "user" which is assumed to be the format required for submitting SQL statements to the JDBC driver corresponding to database node 101a. Accordingly, SQL statement 503 can be provided to the appropriate database driver, via a connection from connection pool bucket 231a, to cause the entry to be inserted into the shard of the user table on database node 101a.

To this point, each example has been related to instances where the user table is horizontally sharded. However, the techniques of the present invention can also be applied when the user table is vertically sharded. For example, it may be assumed that the user table includes columns for id, name, age, and type, and that the user table is vertically sharded by storing the name and type columns in database node 101a and the age column in database node 101b. Information about this vertical sharding of the user table (i.e., information defining on which database nodes each column of the user table is stored) can be stored in database metadata store 213b. Then, if SQL provider 211 were to receive a JDBC SQL statement of "SELECT * FROM user WHERE type='guest' and age>5" from JDBC API 202, SQL provider 211 could generate the following two statements:

SELECT id, name, type FROM db1.user WHERE type='guest'; and

SELECT id, age FROM db2.user WHERE age>5.

This first statement includes routing information (db1.user) to indicate that the statement should be directed to database node 101a. The first statement also selects only the id, name, and type columns but not the age column since the age column is not stored in the vertical shard on database node 101a. Similarly, the second statement includes routing information (db2.user) to indicate that the statement should be directed to database node 101b. The second statement is configured to select the id and age columns.

Figure 6:
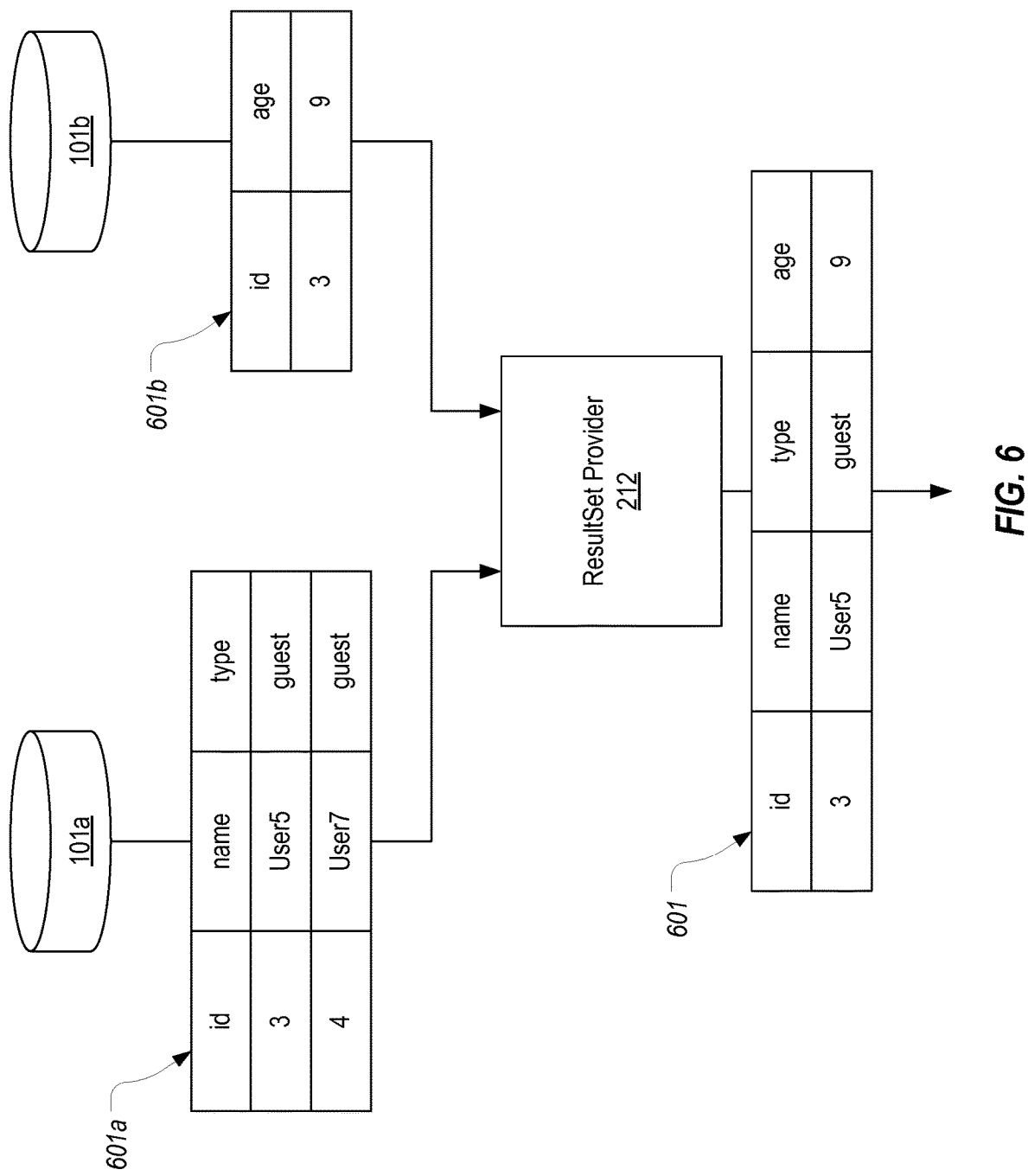
FIG. 6 illustrates how result sets returned from vertical shards of a table can be processed to generate a single result set.

In response to the execution of these two statements, database nodes 101a and 101b will each return a result set. ResultSet provider 212 can process these two result sets to generate a single result set to be returned to JDBC API 202 (i.e., to be returned via JDBC API 202 to application 201). FIG. 6 illustrates an example of how this can be performed. As shown, database node 101a has returned a result set 601a that includes two entries indicating that there are two users that are guests in the user table, while database node 101b has returned a result set 601b that includes a single entry indicating that there is only one user whose age is greater than 5. ResultSet provider 212 can receive result sets 601a and 601b and vertically merge then to produce result set 601. In this case, the value of the id column in each result set 601a and 601b is employed to appropriately perform the merge. Accordingly, result set 601 includes an entry for User5 who is 9 years old and is a guest.

As briefly addressed above, various techniques can be employed to choose how to route an INSERT statement (or other similar statement) to a particular shard. It is noted that the selection of a particular shard can be performed by pool chooser 221 in some embodiments (such as when the shard is selected based on load), or by SQL router provider 211c in other embodiments (such as when the shard is selected based on other random or non-random criteria). In some embodiments, the selection can be performed by employing the primary key for the entry to be inserted to identify which shard the entry will be stored on. For example, for each new entry, a unique sequence value can be generated. In addition, a route value can be generated and appended to the sequence value such that the primary key is the combination of the unique sequence value and the route value. Various techniques can be employed to calculate the route value. For example, the route value can be generated based on the unique sequence value such as by using either of the following formulas where % represents the modulo operation:

route value=sequence value % number of database nodes;
route value=sequence value % max records of table.

In other embodiments, the route value can be determined based on one or more values in the SQL statement. For example, if the SQL statement includes a value of "admin" for a particular field, the SQL statement can be routed to a particular shard. In further embodiments, the route value can be selected randomly (e.g., route value=random(min, max), where min and max define the range of possible routing values to available database nodes). Accordingly, in some embodiments, the routing information can be embedded within a primary key or other identifier of an entry.

Figure 7:
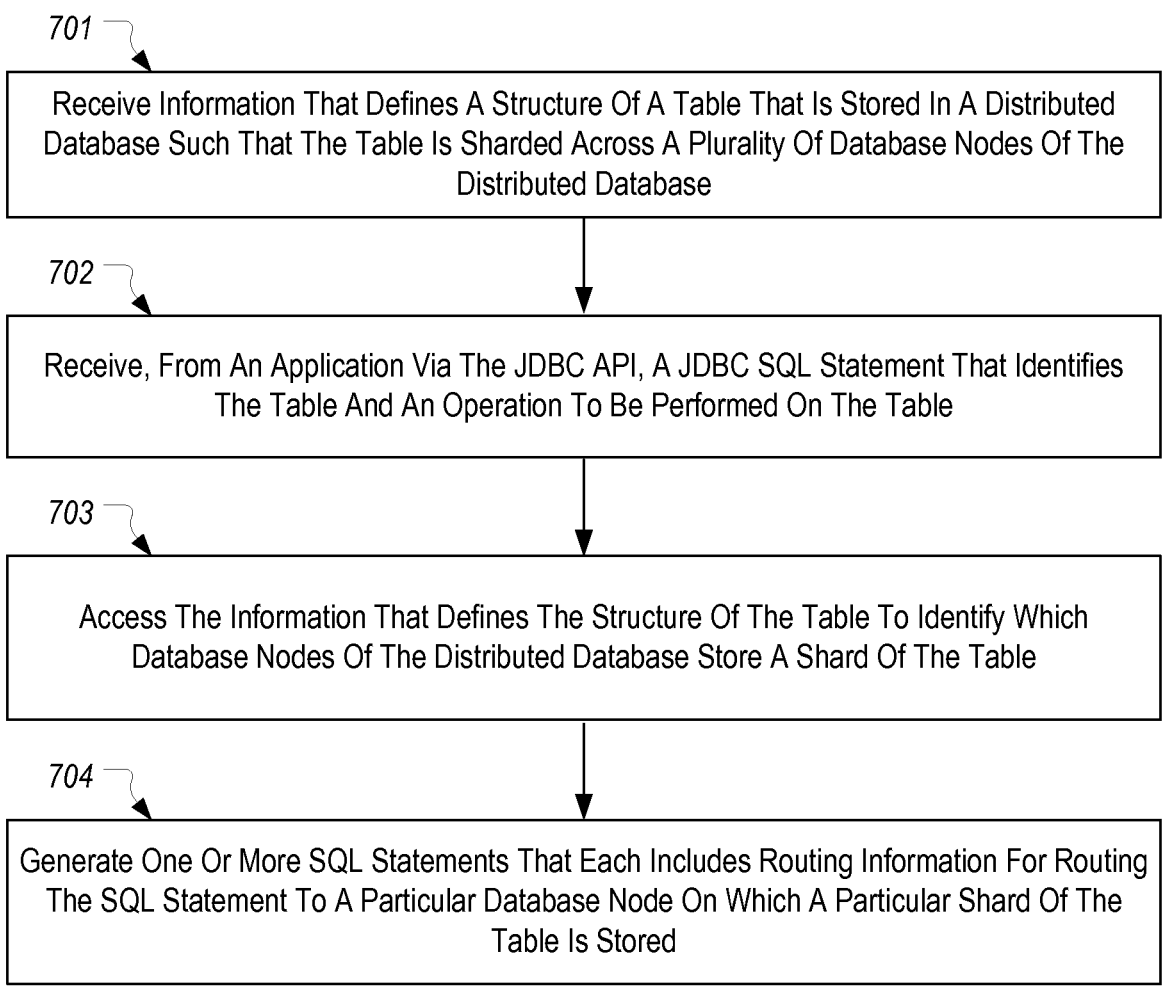
FIG. 7 illustrates a flowchart of an example method for processing a JDBC SQL statement.

FIG. 7 illustrates a flowchart of an example method 700 for processing a JDBC SQL statement. Method 700 can be implemented by the JDBC-X architecture depicted in FIG. 2.

Method 700 includes an act 701 of receiving information that defines a structure of a table that is stored in a distributed database such that the table is sharded across a plurality of database nodes of the distributed database. For example, database monitor 232 and/or database metadata monitor 213a can receive information that defines that distributed database 101 includes database nodes 101a and 101b on which shards of the user table are stored.

Method 700 includes an act 702 of receiving, via the JDBC API and from an application, a JDBC SQL statement that identifies the table and an operation to be performed on the table. For example, SQL provider 211 can receive JDBC SQL statement 302, 401, or 501.

Method 700 includes an act 703 of accessing the information that defines the structure of the table to identify which database nodes of the distributed database store a shard of the table. For example, SQL provider 211 can access database metadata store 213b.

Method 700 includes an act 704 of generating one or more SQL statements that each includes routing information for routing the SQL statement to a particular database node on which a particular shard of the table is stored. For example, SQL provider 211 can generate SQL statements 303a and 303b, SQL statements 401a-401n, or SQL statement 503.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by distributed database driver middleware that operates between a call-level application programming interface (API) and one or more database drivers, for processing a structured query language (SQL) statement that an application submits via the call-level API, the method comprising:
    receiving information that defines a structure of a table that is stored in a distributed database, the information defining that the table is shard across a plurality of database nodes of the distributed database;
    receiving, from the application via the call-level API, a first SQL statement that identifies the table and an operation to be performed on the table;
    accessing the information that defines the structure of the table to identify which database nodes of the distributed database store a shard of the table;
    generating, from the first SQL statement and based on the identification of which database nodes of the distributed database store a shard of the table, multiple separate SQL statements that each includes routing information for routing the separate SQL statement to a particular database node on which a particular shard of the table is stored, wherein generating the multiple separate SQL statements from the first SQL statement comprises generating a separate SQL statement for each of the plurality of database nodes that stores a shard of the table;
    for each of the multiple separate SQL statements, submitting the separate SQL statement to a database driver that corresponds to the particular database node to thereby cause the separate SQL statement to be directed to the particular shard of the table that is stored on the particular database node;
    receiving a result set from each of the plurality of database nodes,
    processing the plurality of result sets to generate a single result set; and
    returning the single result set to the application via the call-level API.

2. The method of claim wherein each of the multiple separate SQL statements is a SELECT statement.

3. The method of claim 1, wherein each of the multiple separate SQL statements is an UPDATE statement.

4. The method of claim wherein each of the multiple separate SQL statements is a DELETE statement.

5. The method of claim 1, further comprising:
    receiving, from the application via the call-level API, a second SQL statement that includes an INSERT statement;
    employing the information to select a first database node of the plurality of database nodes;
    generating, from the second SQL statement, a single SQL statement that includes routing information to the first database node of the plurality of database nodes.

6. The method of claim 5, wherein the first database node is selected based on a load of the plurality of database nodes.

7. The method of claim 5, wherein the first database node is selected based on a sequence value assigned to an entry to be inserted by the INSERT statement.

8. The method of claim 5, wherein the first database node is selected randomly.

9. The method of claim 5, wherein the first database node is selected based on a value of a field specified in the second SQL statement.

10. The method of claim 1, wherein processing the plurality of result sets to generate the single result set comprises one or more of merging, ordering, or filtering entries in the plurality of result sets.

11. One or more non-transitory computer storage media storing computer executable instructions defining distributed database driver middleware that operates between a call-level application programming interface (API) and one or more database drivers, the distributed database middleware including:
    a database metadata store configured to store information defining a structure of a table that is stored in a distributed database including defining which database nodes of a plurality of database nodes in the distributed database store a shard of the table;
    a structure query language (SQL) provider configured to:
        receive, from an application via the call-level API, a first SQL statement that identifies the table and an operation to be performed on the table;
        access the database metadata store to identify which database nodes of the plurality of database nodes store a shard of the table;
        generate, from the first SQL statement and based on the identification of which database nodes store a shard of the table, multiple separate SQL statements that each includes routing information for routing the separate SQL statement to a particular database node on which a particular shard of the table is stored, wherein generating the multiple separate SQL statements from the first SQL statement comprises generating a separate SQL statement for each of the plurality of database nodes that store a shard of the table when the first SQL statement comprises a SELECT, UPDATE, or DELETE; and for each of the multiple separate SQL statements, submitting the separate SQL statement to a database driver that corresponds to the particular database node to thereby cause the separate SQL statement to be directed to the particular shard of the table that is stored on the particular database node; and a ResultSet provider configured to:

receive a result set from each of the database nodes;

process the result sets to generate a single result set; and return the single result set to the application via the call-level API.

12. The computer storage media of claim 11, wherein the SQL provider is further configured to:

receive, from the application via the call-level API, a second SQL statement that includes an INSERT statement;

employ the information to select a first database node of the plurality of database nodes; and generate, from the second SQL statement, a single SQL statement that includes routing information to the first database node.

13. The computer storage media of claim 12, wherein the routing information is selected:

randomly;

based on a load of the database nodes;

based on a sequence number associated with the INSERT operation; or based on a value of a field in the second SQL statement.

14. The computer storage media of claim 11, wherein the distributed database driver middleware further includes:

a database monitor configured to detect changes to the structure of the distributed database and to maintain a connection pool bucket for each database node in the distributed database;

a pool monitor for monitoring the status of each connection pool bucket; and a pool chooser for selecting a particular connection pool bucket to handle each of the multiple separate SQL statements.

15. A method, performed by distributed database driver middleware that operates between a call-level application programming interface (API) and one or more database drivers, for processing a structured query language (SQL) statement that an application submits via the call-level API, the method comprising:

receiving information that defines a structure of a table that is stored in a distributed database, the information defining that the table is shard across a plurality of database nodes of the distributed database;

receiving, from the application via the call-level API, a SELECT statement to be performed on the table;

accessing the information that defines the structure of the table to identify which database nodes of the distributed database store a shard of the table;

generating, from the SELECT statement and based on the identification of which database nodes of the distributed database store a shard of the table, a separate SELECT statement for each of the database nodes that stores a shard of the table, each separate SELECT statement including routing information for routing the separate SELECT statement to the corresponding database node;

submitting each of the separate SELECT statements to a database driver for the corresponding database node to thereby cause the separate SELECT statement to be directed to the shard of the table that is stored on the corresponding database node;

receiving a result set from each of the database nodes that stores a shard of the table;

merging the result sets to produce a single result set; and returning the single result set to the application via the call-level API.

16. The method of claim 15, further comprising:

receiving, from the application via the call-level API, an INSERT statement to be performed on the table;

employing the information to select a first database node of the plurality of database nodes;

generating, from the INSERT statement, a separate INSERT statement that includes routing information to the first database node; and submitting the INSERT statement to a database driver corresponding to the first database node.

* * * * *